April 20, 1943.　　　R. R. CHAPPELL ET AL　　　2,317,028
ACCELEROMETER
Filed Aug. 6, 1941
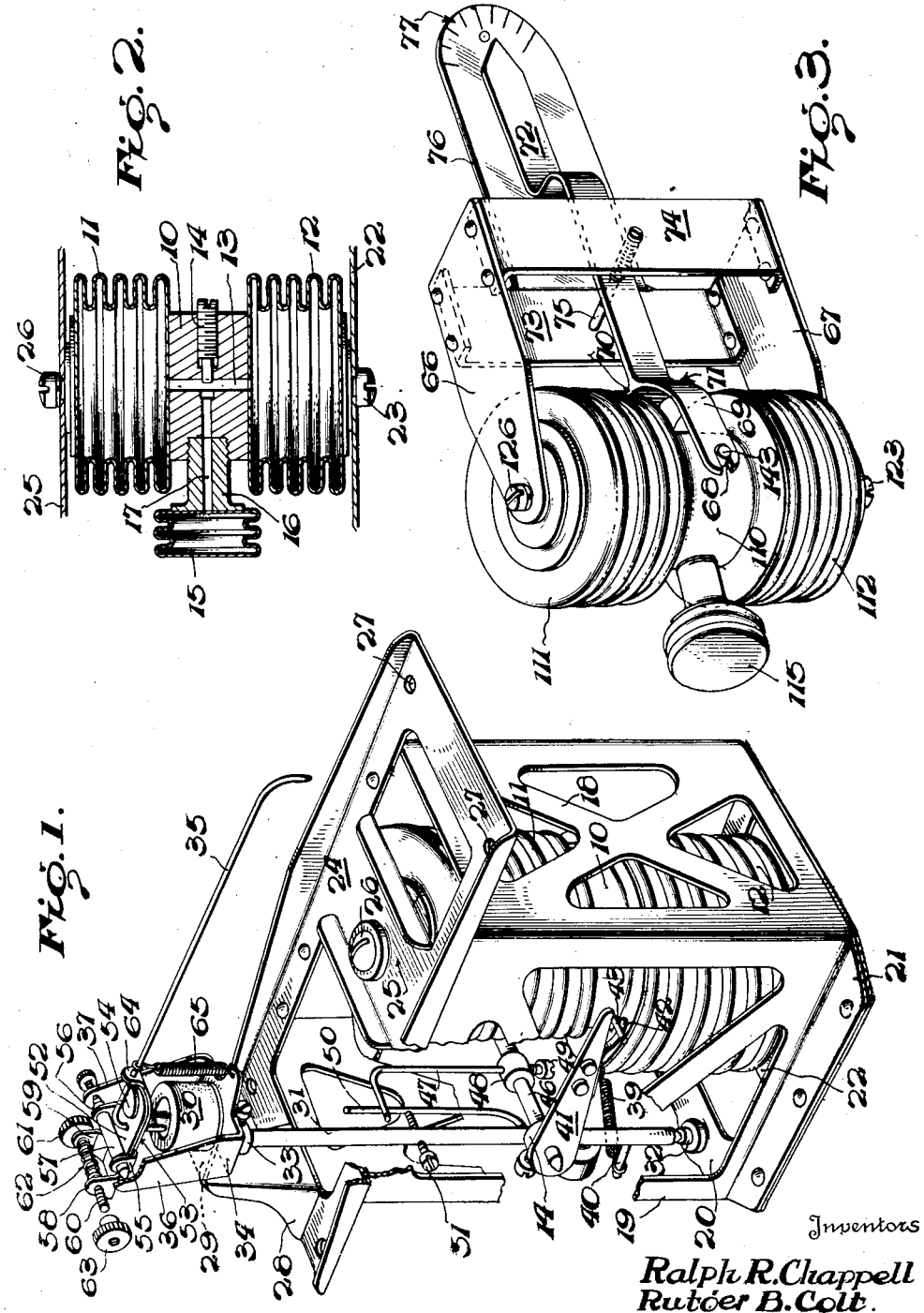
Inventors
Ralph R. Chappell
Rutger B. Colt
By Cerstvik & Kalman
Attorneys Patented Apr. 20, 1943

2,317,028

UNITED STATES PATENT OFFICE 2,317,028

ACCELEROMETER

Ralph R. Chappell, Richmond, Va., and Rutger B. Colt, Baltimore, Md., assignors to Bendix Aviation Corporation, Bendix, N. J., a corporation of Delaware Application August 6, 1941, Serial No. 405,720

6 Claims. (Cl. 264—1)

This invention relates to acceleration responsive means adapted for indicating or recording functions of acceleration, and constitutes a continuation in part of the co-pending parent application, Serial No. 358,726, filed September 27, 1940.

More particularly, the present invention has for its object the provision of a novel, simple, and highly sensitive accelerometer device.

Another object of the invention is to provide a novel accelerometer which is adapted to respond to either vertical or horizontal accelerations.

A further object of the invention is to provide a novel accelerometer device for recording or indicating either vertical or horizontal accelerations.

A still further object of the invention is to provide a novel accelerometer unit for recording vertical accelerations adapted for use with a flight function recording instrument such as that described and claimed in the above-mentioned co-pending parent application.

Another object is to provide novel means comprising a resiliently constrained weighted mass responding to accelerations for recording or indicating the value of such accelerations.

A further object of the invention is to provide a novel acceleration responsive device comprising a weighted mass provided with resilient supporting means which constrain movement of the mass when the latter is subjected to acceleration forces, the resilient constraint constituting fluid damping means which in turn are provided with means for compensating the fluid for temperature changes.

The above and other objects and advantages of the invention will appear more fully hereinafter from a consideration of the detailed description which follows, taken together with the accompanying drawing wherein one embodiment of the invention adapted for two uses is illustrated. It is to be expressly understood, however, that the drawing is for the purpose of illustration and description only and is not designed as a definition of the limits of the invention, reference being had for this purpose to the appended claims.

In the drawing wherein like reference characters refer to like parts throughout the several views:

Figure 1 is a perspective view of the novel acceleration responsive means of the present invention with its mounting and recorder pen;

Figure 2 is a sectional view of the novel accelerometer with its mounting and recorder pen removed; and, Figure 3 is a perspective view of the novel accelerometer used as an acceleration indicating instrument.

The invention consists in providing a properly selected mass of known weight and supporting it between two resilient bellows or diaphragms which in turn are each rigidly secured at their outer ends so as to constrain and limit the movement of the mass therebetween during the presence of forces of acceleration. The damping motion exerted against the movement of the mass is obtained by the provision of a suitable passage within the mass, the amount and rate of fluid passing from one bellows or diaphragm to the other being determined by adjusting means within the passage. Furthermore, expansion and contraction of the damping fluid due to temperature changes may be compensated by the provision of an auxiliary bellows or diaphragm communicating with the passage and expanding and contracting with the fluid to compensate for the temperature changes so that the latter will in no way affect the accuracy of the accelerometer. The calibration of the unit may be determined with ease by the proper selection of the weight of the mass and the strength of material of the bellows or diaphragms.

Referring now to the drawing and more particularly to Figure 1 thereof, the latter illustrates the novel accelerometer of the invention provided with a mounting and a recorder pen, the whole comprising a recording unit adapted to be used with a flight function recording instrument such as that shown in our above-mentioned co-pending application.

The accelerometer comprises a solid mass or weight 10, as better shown in Figure 2, which is constrained to move vertically by means of resilient bellows or diaphragms 11 and 12 which serve as centralizing means for the weight. The two bellows 11 and 12 are connected by way of an annular passage 13 formed in the weight 10 so as to allow a damping fluid to pass from one bellows to the other at a rate governed by an adjusting screw 14 communicating with annular passage 13.

A compensating bellows 15 is carried by a threaded boss 16 which in turn is secured to weight 10 and the interior of bellows 15 communicates with annular passage 13 by way of a transverse passage 17 so as to compensate for expansion or contraction of the fluid within the system due to temperature changes.

Compensation for the expansion and contraction of the fluid within the system by the compensating bellows 15 is obtained due to the fact that when the fluid expands in bellows 11 and 12 upon an increase in temperature, both of said bellows 11 and 12 tend to expand in opposite directions, i. e., toward each other since their other ends are fixed, so that the expansion of one bellows opposes that of the other and, hence, the mass or weight 10 remains stationary. If this expansion of the fluid were not taken care of, a pressure would be built up in the bellows 11 and 12 which would tend to rupture said pair of bellows. This build-up pressure is relieved by its being transmitted through the fluid into the compensating bellows 15, thereby causing the latter to expand. When the temperature decreases, the opposite effect takes place, i. e. bellows 11 and 12 tend to contract in opposite directions and cause a decrease in the pressure in the bellows 11 and 12 and this decreased pressure is equalized by causing a contraction of the compensating bellows 15.

Referring again to Figure 1 of the drawing, the accelerometer, above described, is enclosed by a frame having front and side plates 18 and 19 which may comprise a stamped sheet metal member bent so as to define a chamber for the accelerometer.

A bottom stamped plate 20 is riveted or otherwise suitably secured to flanges 21 of plates 19 and has a cross-bar 22 whereby one side of the bellows 12 of the accelerometer may be secured thereto by suitable means such as bolt 23, better shown in Figure 2.

The accelerometer frame is further provided with a top stamped plate 24 which is riveted to the frame and is likewise provided with a cross-bar 25 whereby the free end of bellows 11 of the accelerometer is secured thereto by means such as a bolt 26. The bolts 23 and 26 define a vertical supporting axis for the weight 10 and its bellows 11 and 12 whereby the weight responds to vertical accelerations only. It is to be understood, however, that the supporting axis may be rotated 90° to a horizontal position in which position the weight will respond to horizontal accelerations as well.

The outer extension of top plate 24 is preferably drilled as at 27 so as to receive screws or bolts therein whereby the accelerometer together with its frame may be readily secured to the supporting channel members of, and suspended within, the chassis of the recording instrument illustrated in our afore-mentioned co-pending application.

Mounted upon the rear portion of top plate 24 is a bracket member 28 having a bent over portion 29 adapted for supporting an ink reservoir 30. A spindle shaft 31 is rotatably mounted within a bearing 32 carried by bottom plate 20 at one end and in a collar 33 at the other end formed integrally with a support member 34 for the capillary pen 35 having upwardly extending arms 36 and 37. A bolt 38 is provided in the collar 33 whereby the latter may be rigidly secured for movement with the spindle shaft 31. A coil spring 39 secured to plate 19 at one end and to shaft 31 by way of a pin 40 carried by the shaft at its other end yieldably urges the shaft to a predetermined initial position.

When a craft provided with the above described accelerometer device is subjected to acceleration forces, the mass 10 is constrained to move in an upward or downward direction depending upon the direction of acceleration, the amount of such constrained movement being proportional to the vertical accelerations. This constrained movement is translated into rotatable movement of spindle shaft 31 by way of a connecting arm 41 having leaf spring 42 adjacent its end whereby a pin 43 carried by weight 10 is engaged between the spring and the end last-mentioned. The opposite end of arm 41 is rigidly connected by means of a collar 44 and bolt 45 to a rocker shaft 46 mounted transversely with respect to spindle shaft 31 in side plates 19.

A rocker arm 47 is adjustably connected to rocker shaft 46 by means of a collar 48 and bolt 49 for movement therewith and contacts a rod 50 adjustably connected with spindle shaft 31 and engaged by bolt 51. Rocking movement of arm 47 is, therefore, translated into rotatable movement of spindle shaft 31 whereby the support member 34 is rotated, moving pen 35 with its feed end as a pivot point in the reservoir 30.

As described in our co-pending application, novel means are provided for rapid adjustment of pen 35 whereby the latter may be fixed in any predetermined position. Such means constitute, as shown in Figure 1, two flat arms 52 and 53 joined together at one end by means of a member 54 inserted within suitable openings in each of the arms and penned over to permit a scissor action of the two arms about member 54 as a pivot. Lower arm 53 has formed therewith ears 55, 56, which project upwardly over arm 52 and receive a shaft 57 which is suitably mounted for rotation within arms 36 and 37 of support 34. The movable ends of arms 52 and 53 have formed integrally therewith ears 58 and 59 through which passes a screw shaft 60 having a knurled head 61 formed as a part thereof. The inner ends of ears 58 and 59 serve as abutments for a coil spring 62 tending to distend arms 52 and 53 while a nut 63 is provided for the free end of screw shaft 60 so as to tension spring 62, and adjust the position of the pen as desired.

The pen 35 passes through an ear 64 of top arm 52 providing a guiding slot for the pen and the latter communicates with the reservoir 30 by having a downwardly bent portion thereof passing through an opening in top arm 52 and an arcuate slot (not shown) in lower arm 53. A coil spring 65 suitably secured to support 34 at one of its ends, contacts the pen at its other end adjacent arms 52 and 53 to urge the pen downwardly against a chart (not shown). Since the novel adjustment mechanism of the pen has been shown and described in detail in our co-pending application, only so much of that structure has been here described as is essential to the present invention.

With the presence of forces of acceleration the weight 10 is moved upwardly or downwardly, depending upon the direction of acceleration, and diaphragms 11 and 12 dampen movement of the weight allowing fluid to pass from one diaphragm to the other through the annular passage 13 at a rate governed by adjusting screw 14 (Fig. 2). The amount of movement of weight 10 thus dampened is proportional to the value of the acceleration forces acting thereon. As shown in Figure 2, the accelerometer responds to vertical accelerations only, however, the axis defined by bolts 23, 26 may be disposed in a horizontal rather than vertical plane and the accelerometer will respond to horizontal accelerations as well.

As weight 10 moves against the centralizing action of diaphragms 11 and 12, pin 43 carried by the weight moves therewith angularly moving spindle shaft 31 to operate pen 35 in the manner above described to produce a permanent record of the values of acceleration encountered during flight.

The novel accelerometer has been described hereinabove in connection with a novel recording mechanism but may be used, as well, to indicate directly the instantaneous values of acceleration.

To carry out the last named function, the novel structure of Figure 3 is provided which comprises top and bottom plates 66 and 67 rigidly secured to the free ends of diaphragms 111 and 112, by way of bolts 126 and 123, respectively, and which rigidly mount the accelerometer in a stationary position. Mass 110, centralized by diaphragms 111 and 112, is provided with pens 143 spaced 180° apart which engage with slots 68 (only one being shown) provided in arms 69 and 70 of a yoke member 71 having a pointer 72 formed integrally therewith at the free end thereof.

Top and bottom plates 66 and 67 are joined by means of side plates 73 and 74 suitably secured thereto, the latter plates supporting a shaft 75 therein which passes through an aperture of pointer 72 so as to define a pivotal axis for the pointer. Side plate 73 has secured thereto or formed integrally therewith a back plate 76 which at its free end has a dial or scale 77 formed thereon for cooperation with the pointer.

The accelerometer operates substantially in the manner described in connection with Figures 1 and 2 so that during the presence of acceleration forces the mass 110 tends to move with the forces but is constrained to do so by diaphragms 111 and 112 and the amount of constrained movement is proportional to the acceleration value which is transmitted by way of pins 143 to pointer 72, pivoting the latter about shaft 75 and causing relative movement of pointer 72 with scale 77, the pointer indicating the value of the acceleration. A compensating bellows 115 is provided, as heretofore described, to compensate for temperature variation in bellows 111 and 112. It should be understood that the structure of Figure 3, though shown for indicating vertical accelerations, may have its supporting axis 123, 126 rotated to the horizontal plane so that horizontal acceleration may be indicated as well.

Although but one embodiment of the novel accelerometer adapted for either recording or indicating vertical or horizontal accelerations has been illustrated and described in detail, it is to be expressly understood that the same is not limited thereto. Various changes may be made in the structure and arrangement of parts without departing from the spirit or scope of the invention. For example, air may be used in place of liquid for damping movement of the accelerometer weight. For a definition of the limits of the invention, reference will be had primarily to the appended claims.

What is claimed is:

1. An acceleration responsive device for determining the acceleration of an aircraft, comprising a weighted mass, a plurality of fluid damping means comprising a pair of oppositely disposed bellows supporting said mass therebetween in a predetermined position and containing a fluid for constraining movement of said mass during normal flight of said craft, means providing a fluid passage between said bellows, and metering means for regulating the rate of flow of said fluid through said passage, said mass being adapted to move against the constraining action of said damping means during acceleration of said craft so that the amount of said movement is proportional to the amount of acceleration.

2. An acceleration responsive device for determining the acceleration of an aircraft, comprising a weighted mass, a plurality of damping means comprising a pair of oppositely disposed bellows supporting said mass therebetween in a predetermined position and containing a fluid for constraining movement of said mass during normal flight of said craft, means providing a fluid passage between said bellows, and expansible means interconnected with said bellows through said passage for compensating for pressures created in said bellows due to expansion and contraction of said fluid during temperature change, said mass being adapted to move against the constraining action of said damping means during acceleration of said craft so that the amount of said movement is proportional to the amount of acceleration.

3. An acceleration responsive device for determining the vertical acceleration of an aircraft, comprising a weighted mass, resilient means consisting of a pair of expansible bellows, one on each side of said mass, for supporting the latter for vertical movement in response to vertical acceleration of said aircraft and for constraining movement of said mass during normal level flight of said aircraft, means providing a passage through said mass for communicating said bellows with each other, a fluid in said bellows adapted to flow from one bellows to the other through said passage upon expansion and contraction of said bellows by said mass in response to vertical acceleration of said aircraft, whereby said fluid produces a damping action on said mass, and exhibiting means actuating by the vertical movement of said mass in response to vertical acceleration of said aircraft.

4. An acceleration responsive device for determining the vertical acceleration of an aircraft, comprising a weighted mass, resilient means consisting of a pair of expansible bellows, one on each side of said mass, for supporting the latter for vertical movement in response to vertical acceleration of said aircraft and for constraining movement of said mass during normal level flight of said aircraft, means providing a passage through said mass for communicating said bellows with each other, a fluid in said bellows adapted to flow from one bellows to the other through said passage upon expansion and contraction of said bellows by said mass in response to vertical acceleration of said aircraft, whereby said fluid produces a damping action on said mass, and means actuated by the vertical movement of said mass in response to vertical acceleration of said aircraft, said actuated means comprising a pivotally mounted yoke member connected to and movable with said mass, and exhibiting means secured to said yoke member.

5. An acceleration responsive device for determining the vertical acceleration of an aircraft, comprising a weighted mass, resilient means consisting of a pair of expansible bellows, one on each side of said mass, for supporting the latter for vertical movement in response to vertical acceleration of said aircraft and for constraining movement of said mass during normal level flight of said aircraft, means providing a passage through said mass for communicating said bellows with each other, a fluid in said bellows adapted to flow from one bellows to the other through said passage upon expansion and contraction of said bellows by said mass in response to vertical acceleration of said aircraft, whereby said liquid produces a damping action on said mass, and a third expansible bellows also containing said fluid and communicating with said pair of bellows for compensating pressures produced in said pair of bellows by the expansion and contraction of said fluid due to changes in temperature.

6. An accelerometer comprising a first resilient bellows and a second resilient bellows, a weighted mass supported between said bellows and being provided with a passage therethrough, and a fluid in said bellows being urged to pass through said passage from one bellows to the other during axial movement of said mass whereby the movement of said mass is dampened and constrained by said bellows.

RALPH R. CHAPPELL.
RUTGER B. COLT.